Jan. 17, 1928.

K. E. FEILER 1,656,869

FEEDING MOLTEN GLASS

Filed March 31, 1925

Inventor
Karl E. Peiler
by Robert N. Brown
Attorney.

Patented Jan. 17, 1928.

1,656,869

UNITED STATES PATENT OFFICE.

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE.

FEEDING MOLTEN GLASS.

Application filed March 31, 1925. Serial No. 19,566.

My invention relates to apparatus for feeding molten glass and more particularly to apparatus for controlling the temperature of the molten glass flowing through a forehearth to a feeder.

In feeding molten glass from melting furnaces, the glass is drawn from the furnace into a connecting container commonly called the forehearth, wherein the glass should be brought to the proper temperature and to a state of uniform fluidity transversely of the forehearth, preparatory to being discharged into molds. The forehearth is usually provided with heating means which may be readily controlled to maintain the molten glass at the desired temperature. The glass flowing through a feeder forehearth generally moves faster at the center of the forehearth than at the sides thereof, and this condition produces what is known as channeling. This condition is caused partially by the lack of uniformity in the heat distribution within the forehearth and the chilling action of the side walls. The relatively cold side walls cause the glass adjacent thereto to become more viscous and the added friction with the side walls frequently causes the side portions of the flowing glass to remain practically stationary while the less viscous glass will flow through a channel which it forms in the slower moving glass.

When this condition occurs in the forehearth, the lines of demarcation between the relatively moving portions of plastic glass cause imperfections in the finished ware, and the present invention has for an object to provide apparatus whereby a uniform temperature condition may be imposed upon the flow of glass in the forehearth by regulating the radiation of heat therefrom.

Another object of the invention is to provide mechanism for the purpose specified, which shall be adjustable to permit a variation in the heat radiating from different portions of the glass in the forehearth.

A further object of the invention is to provide apparatus of the character designated, which shall be durable in construction and effective in operation, and which may be readily embodied in the feeder structure.

These and other objects will be more manifest from the accompanying drawings and description, and from the appended claims.

Figure 1:
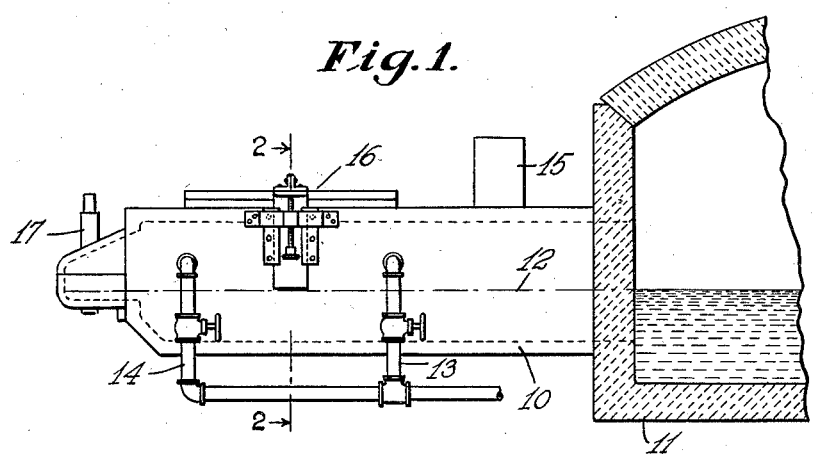
Figure 1 is a diagrammatic representation in side elevation of a forehearth associated with a glass furnace and embodying the invention.

The present invention contemplates the provision of a forehearth having a cover including one or more movable sections which may be adjusted to vary the degree of radiation from certain portions of the glass in the forehearth, and as shown in Fig. 1 of the drawing, the numeral 10 indicates the metallic frame-work of a forehearth structure embodying the invention. As shown, the forehearth is connected to a glass furnace 11, and the depth of glass in the furnace and forehearth is indicated by the line 12. Heat is supplied to the forehearth by fuel pipes 13 and 14, and the draft within the forehearth is regulated in any suitable manner, as for example by the usual stack 15.

Mechanism constructed in accordance with the present invention for directly controlling the radiation of heat from the interior of the forehearth is indicated at 16. Molten glass flowing through the forehearth is discharged to suitably arranged molds or other receptacles (not shown) through the forward or spout portion of the forehearth by the plunger mechanism indicated conventionally at 17. While I have shown the forehearth having only one mechanism located at the top portion of the forehearth for controlling the heat radiating from the interior thereof, it is obvious that additional similar mechanisms may be employed at any desired portion.

Figure 2:
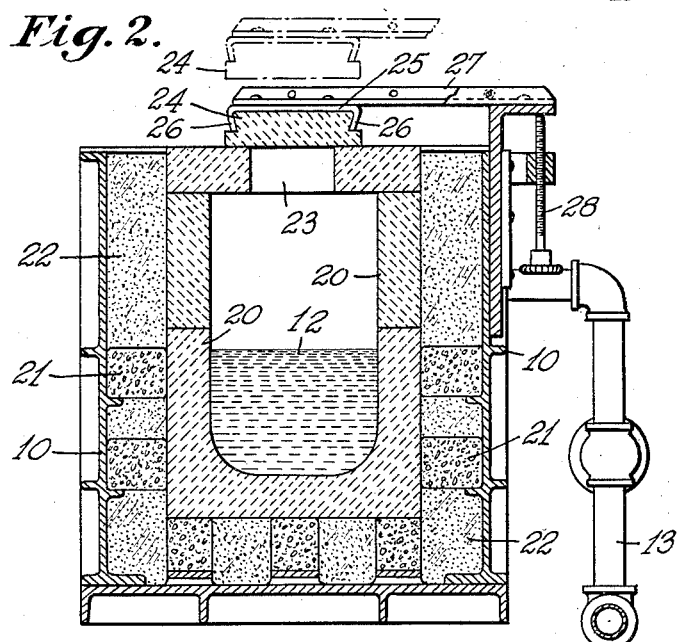
Fig. 2 is a transverse vertical sectional view through the forehearth of a feeder, embodying apparatus constructed in accordance with the present invention, the section being taken substantially on the line 2—2 of Fig. 1.

In Fig. 2 is shown a forehearth of usual construction in which channel blocks 20 are spaced from the metal casing 10 by insulating blocks 21 and the intervening space is filled with any suitable heat insulating material 22.

In apparatus constructed in accordance with the present invention, the forehearth is provided with an opening 23 in the top portion thereof, and this is covered by a refractory cover member 24 which may be operated to open or close the opening in any suitable manner. While I have shown a single cover associated with an opening, it is obvious that one cover may control a plurality of openings. The cover member 24 may be operated in any suitable manner which will effect the desired regulation, but I have found that by moving the cover 24 in parallel relation to the forehearth wall, as indicated in dotted lines, the heat radiating from the molten glass and the walls 20 is effectively controlled. The cover 24 is secured in a metallic frame 25 in any suitable manner, as for example by the clamp ends 26—26 of the frame. The cover is secured to a support bar 27 which is operated by a suitable screw mechanism 28 to raise or lower the refractory cover member as temperature conditions may require.

Figure 3:
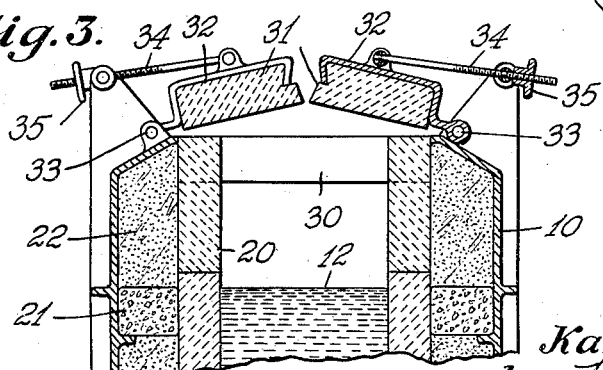
Fig. 3 is a view in section showing a modification of the invention.

In the modification shown in Fig. 3, an opening 30 in the top portion of the forehearth is provided with double cover members 31, 31. These cover members are clamped in suitable frame members 32, 32, which are hingedly mounted on the metallic frame 10 of the forehearth, as indicated at 33, 33. The covers are operated by threaded connecting bars 34, 34, which are operated by pivotally mounted nut members 35, 35, to provide the desired inclination for the cover members.

In practicing the invention, the heat of the forehearth is controlled by the regulation of the refractory cover members 24 or 31 in such a manner that the heat from the molten glass is radiated from only the central portion of the forehearth. As heretofore pointed out, it has been difficult to obtain a heat condition in the forehearth which maintains the flowing glass in a uniform state of fluidity transversely of the forehearth. By providing several openings in the top portion of the forehearth and covering each opening with a removable refractory cover, I am enabled to effectively vary the radiation of heat within the forehearth without regulating or in any way changing the heat supply to the furnace.

In the present invention, should it be observed that the central portion of the stream of glass in the forehearth is too hot, the temperature of this portion may be reduced to correspond more nearly to that of the marginal portions of the stream by opening the refractory block covering the opening in the top portion of the forehearth to radiate a sufficient quantity of heat therefrom, in order to render the temperature of the glass more nearly uniform.

It is obvious that various changes may be made in the structure herein set forth, without departing from the scope of the invention, as set forth in the following claims.

I claim as my invention:

1. In a glass feeder, the combination with a forehearth provided with a channel for conducting molten glass from a furnace to a discharge outlet, of a cover over the channel comprising a plurality of movable refractory cover plates, means for tiltably adjusting the cover plates toward and from the surface of the glass, and means for maintaining the cover plates in their adjusted positions, whereby the radiation of the heat from the glass may be controlled.

2. In apparatus for feeding molten glass, the combination with a forehearth having refractory top and side walls, of means for heating the glass therein, a movable flat refractory cover plate for retarding the radiation of heat at the outer portions of the said glass, and means for adjusting the cover plate toward and from the surface of the glass to accelerate the radiation of heat from the central portion of the said glass.

3. In combination, a forehearth for molten glass having a flat cover wall divided into a plurality of tiltably adjustable cover sections, and means for independently adjusting the cover sections relative to the surface of the glass, whereby the radiation of heat from certain portions of the forehearth may be accelerated or retarded.

4. Apparatus for feeding molten glass comprising a container through which the glass may flow, said container having an opening disposed above the glass line therein, a sectional cover adapted to close said opening, and means for independently opening the sections of said cover to a regulable extent to control the radiation of heat of certain portions of the flowing glass.

5. Apparatus for feeding molten glass comprising a covered flow channel communicating at one end with a source of molten glass supply and provided adjacent to its other end with an outlet for the discharge of successive masses of glass suitable to be formed into articles of glassware, means for heating the glass flowing in said channel, and adjustable temperature regulating means for permitting a regulably greater radiation of heat from the longitudinal median portion of the stream of glass in said channel than from the side portions thereof, whereby the temperature and rate of flow of the stream of glass in the channel will be maintained substantially uniform throughout the cross section of the stream.

6. In glass feeding apparatus, a flow channel communicating at its inner end with a source of molten glass and closed at its outer end, said channel having heat insulated bottom and side walls and having an outlet adjacent to its outer end for the discharge from the stream of glass in the channel of successive masses of glass for use as charges in the production of articles of glassware, a refractory cover for said channel having a ventilating opening located above the longitudinal median portion of said stream, and a refractory member movable vertically from a position to completely close said ventilating opening to position to permit a regulably greater radiation of heat from the longitudinal median portion of the stream than from the side portions thereof, whereby the temperature and rate of flow of the stream of glass in the channel to said discharge outlet can be maintained substantially uniform throughout the cross section of the stream.

7. Apparatus for feeding molten glass comprising a covered flow channel communicating at one end with a source of molten glass supply and provided adjacent to its other end with an outlet for the discharge of successive masses of glass suitable to be formed into articles of glassware, means for heating the glass flowing in said channel, and adjustable ventilating means for permitting a regulably greater upward radiation of heat from the longitudinal median portion of the stream of glass in said channel than from the side portions thereof, whereby the temperature and rate of flow of the stream of glass in the channel will be maintained substantially uniform through the cross section of the stream.

8. The method of feeding molten glass in charges of symmetrical temperature and viscosity and suitable to be formed into articles of glassware, comprising flowing glass in a stream from a source of supply to an outlet for the discharge of said charges successively, maintaining uniform temperature conditions along the sides and bottom of the stream, and regulating the upward radiation of heat from the stream of glass to balance the contact cooling of and to compensate for the friction drag on the sides and bottom of the stream so as to maintain the temperature and rate of flow of the stream substantially uniform throughout the cross section of the stream.

9. The method of feeding molten glass in charges of symmetrical temperature and viscosity and suitable to be formed into articles of glassware, comprising flowing glass in a stream from a source of supply to an outlet for the discharge of said charges successively, maintaining uniform temperature conditions along the sides and bottom of the stream, and regulating the upward radiation of heat from the stream of glass to balance the contact cooling of and to compensate for the friction drag on the sides and bottom of the stream and so that said upward radiation of heat decreases gradually from the longitudinal median line of the stream toward the sides thereof, whereby the temperature and rate of flow of the stream will be maintained substantially uniform throughout the cross section of the stream.

10. The method of feeding molten glass in charges of symmetrical temperature and viscosity and suitable to be formed into articles of glassware, comprising flowing glass in a stream from a source of supply to an outlet for the discharge of such charges successively, supplying heat to the surface of said stream sufficient to heat said stream to a temperature greater than that desired for such charges, preventing practically all radiation of heat from bottom and sides of said stream and regulating the upward radiation of heat from the stream of glass to compensate for the contact cooling of and friction drag on the sides and bottom of the stream so as to maintain the temperature and rate of flow of the stream substantially uniform throughout the cross section of the stream, whereby the portions of the stream discharged through the outlet to produce said charges will have the desired temperature and viscosity which will be maintained substantially uniform throughout their cross section.

Signed at Hartford, Conn., this 28th day of March, 1925.

KARL E. PEILER.